US011990859B2

(12) United States Patent
Franco et al.

(10) Patent No.: US 11,990,859 B2
(45) Date of Patent: May 21, 2024

(54) DEVICES FOR A PHOTOVOLTAIC (PV) MODULE

(71) Applicant: BOREALIS AG, Vienna (AT)

(72) Inventors: Nelson Franco, Jundiaí (BR); Marcelo Giorgetti, Monte Mor-São Paulo (BR)

(73) Assignee: Borealis AG, Vienna (AT)

( * ) Notice: Subject to any disclaimer, the term of this patent is extended or adjusted under 35 U.S.C. 154(b) by 39 days.

(21) Appl. No.: 17/052,872

(22) PCT Filed: May 23, 2019

(86) PCT No.: PCT/EP2019/063371
§ 371 (c)(1),
(2) Date: Nov. 4, 2020

(87) PCT Pub. No.: WO2019/228908
PCT Pub. Date: Dec. 5, 2019

(65) Prior Publication Data
US 2021/0234499 A1    Jul. 29, 2021

(30) Foreign Application Priority Data

May 28, 2018  (EP) .................................... 18174512
Jun. 13, 2018  (EP) .................................... 18177606

(51) Int. Cl.
*H02S 20/00* (2014.01)
*C08L 23/12* (2006.01)

(52) U.S. Cl.
CPC .............. *H02S 20/00* (2013.01); *C08L 23/12* (2013.01); *C08L 2207/02* (2013.01)

(58) Field of Classification Search
CPC ....... H01L 31/00–078; Y02E 10/50–60; H02S 20/00–32
USPC ................................................. 136/243–265
See application file for complete search history.

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 1,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,342,695 A * | 8/1994 | Tsurutani ............... | B32B 27/32 428/516 |
| 5,539,067 A | 7/1996 | Parodi et al. | |
| 5,618,771 A | 4/1997 | Parodi et al. | |
| 6,683,125 B1 * | 1/2004 | Augestad ............ | C08F 297/083 524/451 |
| 9,532,994 B2 | 1/2017 | Parhami | |
| 2004/0084078 A1 | 5/2004 | Yoshida et al. | |
| 2010/0146878 A1 | 6/2010 | Koch et al. | |
| 2011/0248137 A1 | 10/2011 | Barba | |
| 2013/0111831 A1 * | 5/2013 | Jenkins .................... | H02S 20/25 52/173.3 |
| 2013/0160823 A1 * | 6/2013 | Khouri .................... | H02S 20/00 136/251 |
| 2014/0000709 A1 * | 1/2014 | Langmaid ............. | H01L 31/048 136/259 |
| 2017/0077333 A1 * | 3/2017 | Piel ......................... | B32B 27/08 |
| 2017/0349245 A1 * | 12/2017 | Yamashita .............. | H02S 10/40 |

FOREIGN PATENT DOCUMENTS

| | | |
|---|---|---|
| CN | 104781335 A | 7/2015 |
| CN | 105308115 A | 2/2016 |
| CN | 106255719 A | 12/2016 |
| DE | 102012100759 A1 | 8/2013 |
| EP | 45975 A2 | 2/1982 |
| EP | 45976 A2 | 2/1982 |
| EP | 45977 A2 | 2/1982 |
| EP | 0887379 A1 | 12/1998 |
| EP | 2308923 A1 | 4/2011 |
| EP | 2348058 A1 | 7/2011 |
| EP | 2610271 A1 | 7/2013 |
| EP | 2738214 A1 | 6/2014 |
| JP | 2004215911 A | 8/2004 |

(Continued)

OTHER PUBLICATIONS

Office Action for Indian Patent Application No. 202017054039, dated Mar. 30, 2021, 5 pages.
International Search Report and Written Opinion for PCT/EP2019/063371 dated Jan. 16, 2020, 19 pages.
European Search Report for European Patent Application No. 18177606.3 dated Mar. 14, 2019, 11 pages.
Partial European Search Report for European Patent Application No. 18177606.3 dated Jun. 12, 2018, 12 pages.
Taiwanese Office Action for Taiwanese Patent Application No. 108117834 dated Feb. 4, 2020 and english translation thereof, 18 pages.
Partial International Search Report for PCT/EP2019/063371 dated Dec. 6, 2019, 13 pages.
Office Action for JP Application No. 2020563581 dated Jan. 11, 2022 with English Translation, 7 pages.

(Continued)

*Primary Examiner* — Bach T Dinh
(74) *Attorney, Agent, or Firm* — Lowenstein Sandler LLP

(57) ABSTRACT

The present invention relates to a mounting device (MD) for a photovoltaic (PV) module, a connecting element (CE) for a mounting device (MD), a mounting structure (MS) comprising a mounting device (MD) and a photovoltaic (PV) module, an array of mounting structures (MS) comprising two or more mounting structures (MS), a polypropylene copolymer composition for a mounting device (MD) of a photovoltaic (PV) module as well as a polypropylene homopolymer composition for a connecting element (CE) for a mounting device (MD).

16 Claims, 1 Drawing Sheet

(56) References Cited

FOREIGN PATENT DOCUMENTS

| | | | |
|---|---|---|---|
| JP | 2009532676 A | 2/2009 | |
| JP | 6314182 B2 | 6/2010 | |
| JP | 2011066200 A | 3/2011 | |
| JP | 2016505222 A | 2/2016 | |
| JP | 2017005967 A | 1/2017 | |
| JP | 2018016288 A | 2/2018 | |
| JP | 2018047731 A | 3/2018 | |
| WO | 8707620 A1 | 12/1987 | |
| WO | 9212182 A1 | 7/1992 | |
| WO | 9219653 A1 | 11/1992 | |
| WO | 9219658 A1 | 11/1992 | |
| WO | 9219659 A1 | 11/1992 | |
| WO | 9221705 A1 | 12/1992 | |
| WO | 9311165 A1 | 6/1993 | |
| WO | 9311166 A1 | 6/1993 | |
| WO | 9319100 A1 | 9/1993 | |
| WO | 9532994 A1 | 12/1995 | |
| WO | 9736939 A1 | 10/1997 | |
| WO | 9812234 A1 | 3/1998 | |
| WO | 9924478 A1 | 5/1999 | |
| WO | 9924479 A1 | 5/1999 | |
| WO | 0068315 A1 | 11/2000 | |
| WO | 03000754 A1 | 1/2003 | |
| WO | 03000755 A2 | 1/2003 | |
| WO | 03000756 A1 | 1/2003 | |
| WO | 03000757 A1 | 1/2003 | |
| WO | 2004000899 A1 | 12/2003 | |
| WO | 2004029112 A1 | 4/2004 | |
| WO | 2004111095 A1 | 12/2004 | |
| WO | 2007117799 A2 | 10/2007 | |
| WO | 2009029486 A2 | 3/2009 | |
| WO | 2012007430 A1 | 1/2012 | |
| WO | 2012154307 A2 | 11/2012 | |
| WO | 2013113307 A2 | 8/2013 | |
| WO | 2014121090 A | 8/2014 | |
| WO | 2015173175 A | 11/2015 | |
| WO | WO2015173175 | * | 11/2015 |
| WO | 2016136891 A1 | 9/2016 | |
| WO | WO2017071847 | * | 5/2017 |
| WO | 2017209625 A1 | 12/2017 | |
| WO | 9933842 A1 | 10/2020 | |

OTHER PUBLICATIONS

Office Action for JP Application No. 2020516817 dated Jul. 19, 2022 with English Translation, 10 pages.

Office Action for EP Application No. 19725201.8 dated Dec. 5, 2022, 5 pages.

Office Action with English translation for Chinese Application No. 201980032026.5 dated Aug. 31, 2023, 13 pages.

* cited by examiner

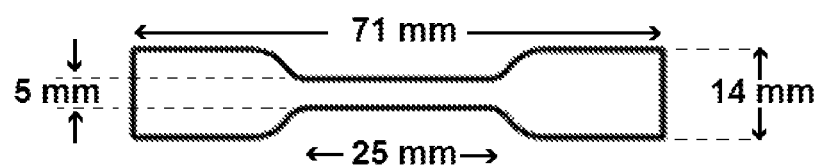

DEVICES FOR A PHOTOVOLTAIC (PV) MODULE

CROSS-REFERENCE TO RELATED APPLICATION(S)

This application is a national phase of International Application No. PCT/EP2019/063371, filed on May 23, 2019, which claims the benefit of European Patent Application No. 18174512.6, filed on May 28, 2018 and of European Patent Application No. 18177606.3, filed on Jun. 13, 2018. The contents of these applications are hereby incorporated by reference in their entirety.

FIELD OF THE INVENTION

The present invention relates to a mounting device (MD) for a photovoltaic (PV) module, a connecting element (CE) for a mounting device (MD), a mounting structure (MS) comprising a mounting device (MD) and a photovoltaic (PV) module, an array of mounting structures (MS) comprising two or more mounting structures (MS), a polypropylene copolymer composition for a mounting device (MD) of a photovoltaic (PV) module as well as a polypropylene homopolymer composition for a connecting element (CE) for a mounting device (MD).

BACKGROUND OF THE INVENTION

Photovoltaic (PV) modules, also known as solar cell modules, produce electricity from light and are used in various kinds of applications, i.e. in outdoor applications, as well known in the field. Typically, such photovoltaic (PV) modules are used in form of a solar power plant comprising a plurality of such modules and thus ensuring a high energy output. The type of the photovoltaic (PV) module can vary. The modules have typically a multilayer structure, i.e. several different layer elements which have different functions. The layer elements of the photovoltaic module can vary with respect to layer materials and layer structure. The final photovoltaic module can be rigid or flexible.

A photovoltaic (PV) module typically comprises a photovoltaic element and one or more further layer elements.

As an example, a photovoltaic (PV) module comprises, in the given order, a protective front layer element, a front encapsulation layer element, a photovoltaic element, a rear encapsulation layer element and a protective back layer element. The protective back layer element is also known as backsheet layer element.

The "photovoltaic element" means that the element has photovoltaic activity. The photovoltaic element can be e.g. an element of photovoltaic cell(s), which has a well known meaning in the art. Silicon based material, e.g. crystalline silicon, is a non-limiting example of materials used in photovoltaic cell(s). Crystalline silicon material can vary with respect to crystallinity and crystal size, as well known to a skilled person. Alternatively, the photovoltaic element can be a substrate layer on one surface of which a further layer or deposit with photovoltaic activity is subjected, for example a glass layer, wherein on one side thereof an ink material with photovoltaic activity is printed, or a substrate layer on one side thereof a material with photovoltaic activity is deposited. For instance, in well-known thin film solutions of photovoltaic elements e.g. an ink with photovoltaic activity is printed on one side of a substrate, which is typically a glass substrate.

"Photovoltaic cell(s)" means herein a layer element(s) of photovoltaic cells, as explained above, together with connectors.

The photovoltaic (PV) module may optionally comprise a protective cover as a further layer element after the backsheet layer element, in the given order, which can be e.g. a metal frame, such as aluminium frame.

It is appreciated that all of said terms have a well-known meaning in the art.

As well known, the elements and the layer structure of a photovoltaic (PV) module can vary depending on the desired type of the photovoltaic (PV) module. The photovoltaic (PV) module can be rigid or flexible. The rigid photovoltaic (PV) module can for example contain a rigid protective front layer element, such as a glass element, a front encapsulation layer element, a photovoltaic layer element, a rear encapsulation layer element and a backsheet layer element which can be rigid or flexible. In flexible modules all the above elements are flexible, whereby the protective front and back as well as the front and rear encapsulation layer elements are typically based on polymeric layer elements.

The separate layer elements of the photovoltaic (PV) module can be produced in a manner well known in the photovoltaic field or from the literature; or are already commercially available as layer elements for PV modules.

Such photovoltaic (PV) modules are typically mounted on a mounting device thereby forming a mounting structure. In such a structure, the mounting device is adapted to support and/or fix the photovoltaic (PV) module thereon for the intended end use application, i.e. the specific usage site such as roofs, ground (like sand, rock etc.) or on a surface of a sea or lake etc. Such mounting devices are typically made from metal or polymers, such as polyethylene, polycarbonate, PVC or fibre-reinforced plastics; see e.g. WO 2016/185267 A1. In order to ensure a large-scale energy production, such mounting structures are usually arranged in form of an array, i.e. comprising two or more mounting structures, at the end use and usage site. For applications, where the mounting device is not or cannot be fixed on the ground, for example for sea or lake applications, the mounting devices of such structures can be connected with each other by connecting elements in order to hold the devices together and thus to keep the structure of the array.

However, for mounting devices and possible connecting elements there are specific requirements to be met. First of all, the corresponding materials used for the mounting devices and possible connecting elements must withstand environmental conditions such as high and low humidity, sun, rain, dust or sand exposure which may, independently from each other, change on a daily basis. On the other hand, the trend is to relocate ground-based solar power plants to the surface of a sea or lake due to large shadow-free areas which are required for a sufficient energy output. However, sea- or lake-based solar power plants must further resist algae growth without harming the environment and further must provide an excellent floatability, even in harsh weather conditions.

All the above problems thus bring a high complexity in the production and provision of solar power plants. Accordingly, there is a continuous need for mounting devices having excellent mechanical properties and UV durability and thus are suitable for supporting and/or fixing photovoltaic (PV) modules in differing environmental conditions for a period of e.g. at least 10 years of exposure. In case of sea- or lake-based plants, it is further desirable to provide mounting devices having excellent floatability in combination with algae growth resistance without harming the environment.

For large solar power plants comprising a plurality of photovoltaic (PV) modules and thus of a plurality of mounting structures (and mounting devices), it is also desirable to provide connecting elements suitable for connecting and/or fixing the mounting devices of the mounting structures to each other. Such connecting elements are exposed to similar environmental conditions as the corresponding mounting devices. Therefore also the connecting elements for connecting and/or fixing the mounting devices should meet certain mechanical properties needed for their function at desired end use application, like for instance for connecting and/or fixing mounting devices in an array of mounting structures thereof.

BRIEF DESCRIPTION OF THE DRAWING

The present disclosure is illustrated by way of example, and not by way of limitation in the figures of the accompanying drawings.

The FIGURE illustrates the dimensions of the dogbone film used in the examples of the present application.

SUMMARY OF THE INVENTION

The foregoing and other objectives are solved by the subject-matter of the present invention. Advantageous embodiments of the inventive method are defined in the corresponding sub-claims.

According to a first aspect, a mounting device (MD) for a photovoltaic (PV) module is provided comprising a polypropylene polymer composition.

It is to be understood herein that the mounting device (MD) of the invention is a separate article, and to be distinguished from a mounting structure (MS) comprising the mounting device (MD) and a photovoltaic (PV) module.

According to one embodiment of the mounting device (MD), the mounting device (MD) is a moulded device comprising, preferably consisting of, the polypropylene polymer composition.

According to another, equally preferable, embodiment of the mounting device (MD), the mounting device (MD) is a layer element comprising one or more layer(s), wherein the one or more layer(s) comprise(s), preferably consist(s) of, the polypropylene polymer composition.

According to yet another embodiment of the mounting device (MD), the polypropylene polymer composition is a polypropylene copolymer composition, preferably the polypropylene copolymer composition comprises one or more polypropylene copolymer(s).

According to one embodiment of the mounting device (MD), the polypropylene copolymer composition comprises one or more polypropylene copolymer(s) comprising propylene monomer units and comonomer units selected from ethylene and/or at least one $C_4$ to $C_{12}$ α-olefin.

According to another embodiment of the mounting device (MD), the polypropylene copolymer composition comprises one or more polypropylene copolymer(s) having one or more, preferably all of the following properties: a) a density measured according to ISO 1183, measured on compression moulded plaques of <920 kg/m³, more preferably in the range from 880 to 910 kg/m³, and/or b) a melt flow rate $MFR_2$ (230° C., 2.16 kg) measured according to ISO 1133 or ASTM D1238 in the range from 1.0 to 110.0 g/10 min, more preferably in the range from 1.0 to 100.0 g/10 min, like in the range from 2.0 to 90.0 g/10 min, and/or c) a flexural modulus measured according to ISO 178 or −1% Secant according to ASTM D790 in the range from 700 to 2500 MPa, preferably in the range from 750 to 2000 MPa, and/or d) a heat deflection temperature (HDT) measured according to ISO 75-1/75-2 at a load of 0.45 MPa in the range of 56 to 150° C., more preferably in the range from 60 to 140° C., and/or e) an Izod notched impact strength measured according to ISO 180 at −20° C. in the range of 1 to 70 kJ/m² or an Izod notched impact strength measured according to ASTM D256 at −20° C. in the range of 1 to 70 J/m.

According to yet another embodiment of the mounting device (MD), the polypropylene polymer composition, preferably the polypropylene copolymer composition, further comprises from 2 to 7 wt.-%, based on the total weight of the composition, of one or more additive(s), preferably the one or more additive(s) is/are selected from the group comprising pigments, preferably color pigments, antioxidants, UV stabilizers, and mixtures thereof.

According to one embodiment of the mounting device (MD), the mounting device (MD) is a floating mounting device, preferably for a sea or lake surface.

According to a further aspect, a connecting element (CE) for a mounting device (MD) is provided comprising a polypropylene polymer composition.

According to one embodiment of the connecting element (CE), the connecting element (CE) is a moulded device comprising, preferably consisting of, the polypropylene polymer composition.

According to another embodiment of the connecting element (CE), the polypropylene polymer composition comprises one or more polypropylene homopolymer(s), and/or one or more heterophasic polymer(s) having a C2 comonomer content of below 5 wt.-%, based on the weight of the heterophasic polymer(s).

According to yet another embodiment of the connecting element (CE), the polypropylene polymer composition comprises one or more polypropylene homopolymer(s), and/or one or more heterophasic polymer(s) having one or more, preferably all of the following properties: a) a density measured according to ISO 1183, measured on compression moulded plaques of <920 kg/m³, more preferably in the range from 890 to <920 kg/m³, and/or b) a melt flow rate $MFR_2$ (230° C., 2.16 kg) measured according to ISO 1133 or ASTM D1238 in the range from 0.1 to 100.0 g/10 min, more preferably in the range from 0.1 to 80.0 g/10 min, like in the range from 0.5 to 60.0 g/10 min, and/or c) a flexural modulus measured according to ISO 178 or −1% Secant according to ASTM D790 in the range from 900 to 4500 MPa, preferably in the range from 1000 to 2500 MPa, and/or d) a heat deflection temperature (HDT) measured according to ISO 75-1/75-2 at a load of 0.45 MPa in the range of 80 to 135° C., more preferably in the range from 90 to 130° C., and/or e) an Izod notched impact strength measured according to ASTM D256 at +23° C. in the range of 3 to 65 J/m.

According to one embodiment of the connecting element (CE), the polypropylene polymer composition further comprises from 15 to 35 wt.-%, based on the total weight of the composition, of enforcing filler(s), preferably glass fibers (GF), and optionally from 2 to 9 wt.-%, based on the total weight of the composition, of one or more additive(s), preferably the one or more additive(s) is/are selected from the group comprising pigments, preferably color pigments, antioxidants, UV stabilizers, polar modified polypropylene (PMP) and mixtures thereof.

According to another aspect, a mounting structure (MS) comprising a mounting device (MD) as defined herein and a photovoltaic (PV) module, wherein the photovoltaic (PV) module is mounted to the mounting device (MD), preferably mounted on the top of the mounting device (MD).

"Mounted" means that the mounting device (MD) is adapted to support and/or fix the photovoltaic (PV) module, preferably a premade photovoltaic (PV) module, e.g. on the top of the mounting device (MD).

According to one embodiment of the mounting structure (MS), the photovoltaic (PV) module comprises a photovoltaic element and one or more further layer elements.

According to still another aspect, an array of mounting structures (MS) comprising two or more mounting structures (MS) as defined herein is provided.

According to one embodiment of the array, the array further comprises one or more connecting element(s) (CE) as defined herein. Preferably, the one or more connecting element(s) (CE) is/are adapted to connect the mounting devices (MD) of the two or more mounting structures (MS).

According to a still further aspect, a polypropylene copolymer composition for a mounting device of a photovoltaic (MD) module is provided. The polypropylene copolymer composition comprises from 93 to 98 wt.-%, based on the total weight of the polypropylene composition, of one or more polypropylene copolymer(s), wherein the polypropylene copolymer composition has one or more, preferably all of the following properties: a) a density measured according to ISO 1183, measured on compression moulded plaques of <920 kg/m$^3$, more preferably in the range from 880 to 910 kg/m$^3$, and/or b) a melt flow rate MFR$_2$ (230° C., 2.16 kg) measured according to ISO 1133 in the range from 1.0 to 110.0 g/10 min, more preferably in the range from 1.0 to 100.0 g/10 min, like in the range from 2.0 to 90.0 g/10 min, and/or c) a flexural modulus measured according to ISO 178 or −1% Secant according to ASTM D790 in the range from 700 to 2500 MPa, preferably in the range from 750 to 2000 MPa, and/or d) a heat deflection temperature (HDT) measured according to ISO 75-1/75-2 at a load of 1.82 MPa in the range of 56 to 150° C., more preferably in the range from 60 to 140° C., and/or e) a Charpy notched impact strength measured according to ISO 179/1eA at −20° C. in the range of 1 to 70 kJ/m$^2$.

According to an even further aspect, a polypropylene polymer composition comprising from 56 to 83 wt.-%, based on the total weight of the composition, of one or more polypropylene homopolymer(s) and/or one or more heterophasic polymer(s) for a connecting element (CE) for a mounting device (MD) is provided. The polypropylene polymer composition has one or more, preferably all of the following properties: a) a density measured according to ISO 1183, measured on compression moulded plaques of >920 kg/m$^3$, more preferably in the range from >920 to 1100 kg/m$^3$, and/or b) a melt flow rate MFR$_2$ (230° C., 2.16 kg) measured according to ISO 1133 in the range from 1.0 to 100.0 g/10 min, more preferably in the range from 1.0 to 80.0 g/10 min, like in the range from 2.0 to 60.0 g/10 min, and/or c) a flexural modulus measured according to ISO 178 or −1% Secant according to ASTM D790 in the range from 2000 to 6600 MPa, preferably in the range from 2500 to 6000 MPa, more preferably in the range from 3000 to 5500 MPa, and/or d) a heat deflection temperature (HDT) measured according to ISO 75-1/75-2 at a load of 1.82 MPa in the range of 90 to 160° C., more preferably in the range from 100 to 155° C., most preferably in the range from 110 to 150° C., and/or e) a Charpy notched impact strength measured according to ISO 179/1eA at +23° C. in the range of 1 to 70 kJ/m$^2$.

DETAILED DESCRIPTION OF THE INVENTION

In the following the invention is described in more detail.

Mounting Device

A mounting device (MD) for a photovoltaic (PV) module according to this invention comprises a polypropylene polymer composition.

It is thus appreciated that the mounting device (MD) is a device, wherein the photovoltaic (PV) module is mounted to the mounting device (MD), preferably mounted on the top of the mounting device (MD).

Thus, the mounting device (MD) refers to a device being adapted to support and/or fix a photovoltaic (PV) module, preferably on the top of the mounting device (MD). The photovoltaic (PV) module preferably comprises a photovoltaic element and one or more further layer elements as described herein.

Preferably, the mounting device (MD) is a moulded device comprising, preferably consisting of, the polypropylene polymer composition. That is to say, the mounting device (MD) comprises, preferably consists of, the polypropylene polymer composition.

Alternatively, the mounting device (MD) is a layer element comprising one or more layer(s), wherein the one or more layer(s) comprise(s), preferably consist(s) of, the polypropylene polymer composition.

It is appreciated that said layer element typically comprises one or more layer(s) that can be produced by using extrusion, like by cast film extrusion. Naturally, a layer element with two or more layers can be produced for instance using coextrusion, like cast film coextrusion. Such extrusion techniques are well known in the art and can be used and adapted according to the desired need and equipment used.

The present mounting device (MD) is not restricted to a specific area of use. Thus, it can be installed on constructions, like facades of buildings, roofs of buildings etc, different grounds such as rocks, sand, clay soil, etc. However, due to the excellent properties of the mounting device, it can be advantageously installed in areas with demanding whether conditions, like water surfaces such as the surface of a sea or lake. Preferably, the mounting device (MD) is a floating mounting device, more preferably for a sea or lake surface.

Furthermore, the mounting device (MD), preferably the floating mounting device, can be in any shape and/or form being suitable for the intended use. For sea or lake surfaces, the shape and/or form of the mounting device (MD) is typically designed to keep the mounting device (MD) floating on the surface. For instance moulded mounting devices (MD) that are hollow can be used for floating mounting device applications. The shape and/or form of the mounting device (MD) thus depends on the desired end use application and can be designed accordingly by a skilled person.

The floating mounting device can be stationary or movable.

The mounting device (MD) of the present invention comprises, preferably consists of a polypropylene polymer composition. It is preferred that the polypropylene polymer composition is a polypropylene copolymer composition.

For example, the polypropylene polymer composition is a polypropylene copolymer composition comprising one or more polypropylene copolymer(s).

It is appreciated that the specific comonomer selected has no significant influence on the properties of the polypropylene copolymer composition and the corresponding end application. Thus, the polypropylene copolymer composition comprises one or more polypropylene copolymer(s) comprising propylene monomer units and comonomer units selected from ethylene and/or at least one $C_4$ to $C_{12}$ α-olefin, in particular ethylene and/or at least one $C_4$ to $C_8$ α-olefins.

It is preferred that the polypropylene copolymer composition comprises one or more polypropylene copolymer(s) having one or more of the following properties:
a) a density measured according to ISO 1183, measured on compression moulded plaques of <920 kg/m³, more preferably in the range from 880 to 910 kg/m³, and/or
b) a melt flow rate $MFR_2$ (230° C., 2.16 kg) measured according to ISO 1133 or ASTM D1238 in the range from 1.0 to 110.0 g/10 min, more preferably in the range from 1.0 to 100.0 g/10 min, like in the range from 2.0 to 90.0 g/10 min, and/or
c) a flexural modulus measured according to ISO 178 or −1% Secant according to ASTM D790 in the range from 700 to 2500 MPa, preferably in the range from 750 to 2000 MPa, and/or
d) a heat deflection temperature (HDT) measured according to ISO 75-1/75-2 at a load of 0.45 MPa in the range of 56 to 150° C., more preferably in the range from 60 to 140° C., and/or
e) an Izod notched impact strength measured according to ISO 180 at −20° C. in the range of 1 to 70 kJ/m² or an Izod notched impact strength measured according to ASTM D256 at −20° C. in the range of 1 to 70 J/m.

In one embodiment, the polypropylene copolymer composition comprises one or more polypropylene copolymer(s) having all of the following properties:
a) a density measured according to ISO 1183, measured on compression moulded plaques of <920 kg/m³, more preferably in the range from 880 to 910 kg/m³, and
b) a melt flow rate $MFR_2$ (230° C., 2.16 kg) measured according to ISO 1133 or ASTM D1238 in the range from 1.0 to 110.0 g/10 min, more preferably in the range from 1.0 to 100.0 g/10 min, like in the range from 2.0 to 90.0 g/10 min, and c) a flexural modulus measured according to ISO 178 or −1% Secant according to ASTM D790 in the range from 700 to 2500 MPa, preferably in the range from 750 to 2000 MPa, and/or
d) a heat deflection temperature (HDT) measured according to ISO 75-1/75-2 at a load of 0.45 MPa in the range of 56 to 150° C., more preferably in the range from 60 to 140° C., and
e) an Izod notched impact strength measured according to ISO 180 at −20° C. in the range of 1 to 70 kJ/m² or an Izod notched impact strength measured according to ASTM D256 at −20° C. in the range of 1 to 70 J/m.

Generally, the term "polypropylene copolymer(s)" encompasses propylene random copolymers, heterophasic polymers and mixtures thereof.

As known for the skilled person, random propylene copolymer is different from heterophasic polypropylene which is a propylene copolymer comprising a propylene homo or random copolymer matrix component (1) and an elastomeric copolymer component (2) of propylene with one or more of ethylene and $C_4$-$C_{12}$ α-olefin copolymers, wherein the elastomeric (amorphous) copolymer component (2) is dispersed in said propylene homo or random copolymer matrix polymer (1).

Thus, the polypropylene polymer composition is a polypropylene copolymer composition comprising one or more propylene random copolymer(s), heterophasic polymer(s) or mixtures thereof.

It is appreciated that the mechanical properties of the mounting device (MD) can be advantageously adjusted if the polypropylene copolymer composition comprises two or more polypropylene copolymers. The polypropylene copolymer composition thus preferably comprises two or three or four polypropylene copolymers. More preferably, the polypropylene copolymer composition comprises two or three, most preferably two, polypropylene copolymers.

In one embodiment, the polypropylene polymer composition is a polypropylene copolymer composition comprising two or more propylene random copolymers, or a polypropylene copolymer composition comprising two or more heterophasic polymers. Preferably, the polypropylene copolymer composition comprises two or more, for example two, heterophasic polymers.

If the polypropylene copolymer composition comprises two or more polypropylene copolymers, the two or more polypropylene copolymers differ from each other. For example, the two or more polypropylene copolymers differ in their melt flow rate $MFR_2$ (230° C., 2.16 kg) measured according to ISO 1133 or ASTM D1238 by at least 30 g/10 min, preferably by at least 50 g/10 min, more preferably in the range from 50 to 100 g/10 min, e.g. in the range from 60 to 80 g/10 min. Alternatively, the two or more polypropylene copolymers differ in their flexural modulus measured according to ISO 178 or −1% Secant according to ASTM D790 by at least 300 MPa, preferably by at least 400 MPa, more preferably in the range from 400 to 1000 MPa, e.g. in the range from 400 to 800 MPa. In one embodiment, the two or more polypropylene copolymers differ in their melt flow rate $MFR_2$ (230° C., 2.16 kg) measured according to ISO 1133 or ASTM D1238 by at least 30 g/10 min, preferably by at least 50 g/10 min, more preferably in the range from 50 to 100 g/10 min, e.g. in the range from 60 to 80 g/10 min, and in their flexural modulus measured according to ISO 178 or −1% Secant according to ASTM D790 by at least 300 MPa, preferably by at least 400 MPa, more preferably in the range from 400 to 1000 MPa, e.g. in the range from 400 to 800 MPa.

In one specific embodiment of the present invention, the two or more polypropylene copolymers are heterophasic polymers.

The "heterophasic polymer" is referred herein also as "heterophasic polypropylene" or "heterophasic propylene copolymer".

Generally, a heterophasic polymer is a polypropylene copolymer comprising a propylene homopolymer or propylene random copolymer matrix component (1) and an elastomeric copolymer component (2) of propylene with one or more of ethylene and/or $C_4$-$C_{12}$ α-olefin copolymers, wherein the elastomeric (amorphous) copolymer component (2) is dispersed in said propylene homo- or random copolymer matrix polymer (1).

Accordingly, the heterophasic polymer as used herein means that the elastomeric (amorphous) propylene copolymer component is (finely) dispersed in the polypropylene matrix component.

In case the matrix component is a homopolymer of propylene, then the amount of the xylene cold soluble (XCS) fraction (amorphous fraction) (wt.-%) of the heterophasic polymer is understood in this application also as the amount of the elastomeric propylene copolymer component present in the heterophasic polymer, i.e., the XCS fraction of the heterophasic polymer is in practice and regarded herein as the elastomeric component, since the amount of XCS fraction in the matrix component is markedly lower.

Each heterophasic polymer has preferably a flexural modulus measured in the range from 700 to 2500 MPa, preferably in the range from 750 to 2000 MPa, when measured according to ISO178 or −1% Secant according to ASTM D790 as described below under Determination methods. If the polypropylene copolymer composition comprises two or more, preferably two, heterophasic polymers, one heterophasic polymer preferably has a flexural modulus measured in the range from 700 to 1300 MPa, preferably in the range from 850 to 1200 MPa, when measured according to ISO178 or −1% Secant according to ASTM D790, another heterophasic polymer preferably has a flexural modulus measured in the range from 1250 to 2500 MPa, preferably in the range from 1300 to 2000 MPa, when measured according to ISO178 or −1% Secant according to ASTM D790.

Each heterophasic polymer has preferably a melt flow rate $MFR_2$ (230° C., 2.16 kg) measured according to ISO 1133 or ASTM D1238 in the range from 1.0 to 110.0 g/10 min, more preferably in the range from 1.0 to 100.0 g/10 min, like in the range from 2.0 to 90.0 g/10 min. If the polypropylene copolymer composition comprises two or more, preferably two, heterophasic polymers, one heterophasic polymer preferably has a melt flow rate $MFR_2$ (230° C., 2.16 kg) measured according to ISO 1133 or ASTM D1238 in the range from 1.0 to 50.0 g/10 min, more preferably in the range from 1.0 to 30.0 g/10 min, like in the range from 2.0 to 20.0 g/10 min, another heterophasic polymer preferably has a melt flow rate $MFR_2$ (230° C., 2.16 kg) measured according to ISO 1133 or ASTM D1238 in the range from 50.0 to 110.0 g/10 min, more preferably in the range from 60.0 to 100.0 g/10 min, like in the range from 70.0 to 90.0 g/10 min.

For example, if the polypropylene copolymer composition comprises two or more, preferably two, heterophasic polymers, one heterophasic polymer preferably has a flexural modulus measured in the range from 700 to 1300 MPa, preferably in the range from 850 to 1200 MPa, when measured according to ISO178 or −1% Secant according to ASTM D790, and a melt flow rate $MFR_2$ (230° C., 2.16 kg) measured according to ISO 1133 or ASTM D1238 in the range from 1.0 to 50.0 g/10 min, more preferably in the range from 1.0 to 30.0 g/10 min, like in the range from 2.0 to 20.0 g/10 min. Additionally, another heterophasic polymer preferably has a flexural modulus measured in the range from 1250 to 2500 MPa, preferably in the range from 1300 to 2000 MPa, when measured according to ISO178 or −1% Secant according to ASTM D790, and a melt flow rate $MFR_2$ (230° C., 2.16 kg) measured according to ISO 1133 or ASTM D1238 in the range from 50.0 to 110.0 g/10 min, more preferably in the range from 60.0 to 100.0 g/10 min, like in the range from 70.0 to 90.0 g/10 min.

Each heterophasic polymer has preferably a Vicat softening temperature measured according to ISO 306 or ASTM D 1525 at 10N of at least 135° C., preferably of 138 to 165° C., more preferably of 138 to 155° C.

Each heterophasic polymer has preferably a comonomer selected from ethylene and/or at least one $C_4$-$C_{12}$ α-olefin comonomer.

Each heterophasic polymer has preferably a density measured according to ISO 1183, measured on compression moulded plaques of <920 kg/m$^3$, more preferably in the range from 880 to 910 kg/m$^3$.

Each heterophasic polymer has preferably a heat deflection temperature (HDT) measured according to ISO 75-1/75-2 at a load of 0.45 MPa in the range of 56 to 150° C., more preferably in the range from 60 to 140° C. If the polypropylene copolymer composition comprises two or more, preferably two, heterophasic polymers, one heterophasic polymer preferably has a heat deflection temperature (HDT) measured according to ISO 75-1/75-2 at a load of 0.45 MPa in the range of 56 to 100° C., more preferably in the range from 60 to 90° C., another heterophasic polymer preferably has a heat deflection temperature (HDT) measured according to ISO 75-1/75-2 at a load of 0.45 MPa in the range of 100 to 150° C., more preferably in the range from 110 to 140° C.

Each heterophasic polymer has preferably an Izod notched impact strength measured according to ISO 180 at −20° C. in the range of 1 to 70 kJ/m$^2$ or an Izod notched impact strength measured according to ASTM D256 at −20° C. in the range of 1 to 70 J/m. If the polypropylene copolymer composition comprises two or more, preferably two, heterophasic polymers, one heterophasic polymer preferably has an Izod notched impact strength measured according to ISO 180 at −20° C. in the range of 1 to 25 kJ/m$^2$ or an Izod notched impact strength measured according to ASTM D256 at −20° C. in the range of 1 to 25 J/m, another heterophasic polymer preferably has an Izod notched impact strength measured according to ISO 180 at −20° C. in the range of 25 to 70 kJ/m$^2$ or an Izod notched impact strength measured according to ASTM D256 at −20° C. in the range of 25 to 70 J/m.

The polypropylene matrix component of the heterophasic polymers may be a unimodal or a multimodal random copolymer or homopolymer of propylene which both have a well-known meaning. Multimodal random copolymer or homopolymer of propylene means herein that it has at least two polymer fractions which are different e.g. with one or two of the following properties: 1) weight average molecular weight or 2) MFR. In case of random copolymer of propylene as the matrix component, the copolymer can also be multimodal with respect to 3) comonomer content, optionally in combination with any or both of the above differences 1) and 2).

The matrix component of the heterophasic polymer(s) can be a homopolymer or random copolymer of propylene. It is preferred that the matrix component of the heterophasic polymer(s) is a homopolymer of propylene.

Accordingly, it is preferred that all the comonomers as defined above which are present in the heterophasic polymer(s) originate from the elastomeric propylene copolymer component.

It is preferred that the heterophasic polymer(s) consist(s) of the matrix component and the elastomeric component. The heterophasic polymer(s) may optionally comprise a prepolymer fraction, as well known in the polymer field. In such case the amount of the prepolymer is calculated to the amount of the matrix component.

Furthermore, it is preferred that the heterophasic polymer(s) is/are non-grafted. Non-grafted means that said heterophasic polymer(s) is/are not grafted with functional groups, such as polar groups, like maleic acid anhydride (MAH) groups, or silane containing groups.

If the polypropylene copolymer composition comprises two heterophasic polymers, the weight ratio between the first and second heterophasic polymer is preferably from 10:1 to 2:1, more preferably from 8:1 to 3:1 and most preferably from 6:1 to 4:1.

The heterophasic polymer(s) are commercially available grade(s) or can be produced e.g. by conventional polymerisation processes. As non-limiting examples of suitable commercially available products (grades) for the mounting device (MD), for instance CP180R and CP396XP of Braskem as well as EE050AI and BJ368MO of Borealis can be mentioned.

As to the polymerisation of the heterophasic polymer(s), the individual components (matrix and elastomeric components) of the heterophasic polymer(s) can be produced separately and blended mechanically by mixing in a mixer or extruder. However it is preferred that the heterophasic polymer(s) comprising the matrix component and the elastomeric component are produced in a sequential process, using reactors in serial configuration and operating at different reaction conditions. As a consequence, each fraction prepared in a specific reactor will have its own molecular weight distribution, MFR and/or comonomer content distribution.

The heterophasic polymer(s) according to this invention can be preferably produced in two or more reactors in a gas-phase polymerization process as developed by the Dow Chemical Company (known as UNIPOL™ process) which is well known in the art. In such a process, it is preferred that the matrix component is prepared in one or two reactors and the elastomeric component is produced in a corresponding second or third reactor.

For example, the heterophasic polymer(s) can be produced in a process comprising the steps of
(a) polymerising propylene and optionally at least one ethylene and/or $C_4$ to $C_{12}$ α-olefin, preferably propylene as the only monomer, in the presence of a catalyst in a first reactor (R1),
(b) polymerizing in the same reactor and in the presence of said first polypropylene polymer, propylene and optionally at least one ethylene and/or $C_4$ to $C_{12}$ α-olefin, preferably propylene as the only monomer, obtaining thereby the second polypropylene fraction, preferably said second polypropylene fraction is a second propylene homopolymer, whereby said first polypropylene fraction and said second polypropylene fraction form the matrix component of the heterophasic polymer(s),
(c) transferring the reaction mixture of the polymerised matrix component of step (c) into a second reactor (R2), and
(d) polymerising in the second reactor (R2) and in the presence of the matrix component obtained in step (c), propylene and at least one ethylene and/or $C_4$ to $C_{12}$ α-olefin obtaining thereby the elastomeric component of the heterophasic polymer(s), wherein the elastomeric propylene copolymer component is dispersed in said matrix component.

Alternatively, the heterophasic polymer(s) according to this invention is/are produced in a sequential polymerisation process, i.e. in a multistage process, known in the art, wherein the matrix component is produced at least in one slurry reactor, preferably at least in a slurry reactor, and optionally, and preferably in a subsequent gas phase reactor, and subsequently the elastomeric component is produced at least in one, i.e. one or two, gas phase reactor(s) (gpr), preferably in one gpr.

Accordingly it is preferred that the heterophasic polymer(s) is/are produced in a sequential polymerisation process comprising the steps of
(a) polymerising propylene and optionally at least one ethylene and/or $C_4$ to $C_{12}$ α-olefin, preferably propylene as the only monomer, in the presence of a catalyst in a first reactor (R1),
(b) transferring the reaction mixture of the polymerised first polypropylene, preferably propylene homopolymer, fraction together with the catalyst, into a second reactor (R2), (c) polymerising in the second reactor (R2) and in the presence of said first polypropylene polymer, propylene and optionally at least one ethylene and/or $C_4$ to $C_{12}$ α-olefin, preferably propylene as the only monomer, in obtaining thereby the second polypropylene fraction, preferably said second polypropylene fraction is a second propylene homopolymer, whereby said first polypropylene fraction and said second polypropylene fraction form the matrix component of the heterophasic polymer(s),
(d) transferring the reaction mixture of the polymerised matrix component of step (c) into a third reactor (R3),
(e) polymerising in the third reactor (R3) and in the presence of the matrix component obtained in step (c), propylene and at least one ethylene and/or $C_4$ to $C_{12}$ α-olefin obtaining thereby the elastomeric component of the heterophasic polymer(s), wherein the elastomeric propylene copolymer component is dispersed in said matrix component.

Optionally the elastomeric component can be produced in two reactors, whereby after above step (e),
(f) transferring the polypropylene (PP) in which the first elastomeric propylene copolymer fraction is dispersed in a fourth reactor (R4), and
(g) polymerising in the fourth reactor (R4) and in the presence of the mixture obtained in step (e) propylene and at least one ethylene and/or $C_4$ to $C_{12}$ α-olefin obtaining thereby the second elastomeric propylene copolymer fraction, whereby the polypropylene (PP), the first elastomeric propylene copolymer fraction, and the second elastomeric propylene copolymer fraction form the heterophasic polymer(s).

Preferably between the second reactor (R2) and the third reactor (R3) the monomers are flashed out.

The term "sequential polymerisation process" indicates that the heterophasic polymer(s) is produced in at least two, like three, reactors connected in series. Accordingly the present process comprises at least a first reactor (R1) and a second reactor (R2), more preferably a first reactor (R1), a second reactor (R2), a third reactor (R3) and optionally a fourth reactor (R4). The term "polymerisation reactor" shall indicate that the main polymerisation takes place. Thus in case the process consists of four polymerisation reactors, this definition does not exclude the option that the overall process comprises for instance a prepolymerisation step in a prepolymerisation reactor. The term "consist of" is only a closing formulation in view of the main polymerisation reactors.

Any prepolymer fraction is counted into the amount of the first polypropylene fraction.

The first reactor (R1) is preferably a slurry reactor (SR) and can be any continuous or simple stirred batch tank reactor or loop reactor operating in bulk or slurry. Bulk means a polymerisation in a reaction medium that comprises of at least 60% (w/w) monomer. According to the present invention the slurry reactor (SR) is preferably a (bulk) loop reactor (LR).

The second reactor (R2), the third reactor (R3) and the optional fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the optional fourth reactor (R4) are gas phase reactors (GPR). Accordingly for the instant process at least three, namely a slurry reactor (SR), like a loop reactor (LR), a first gas phase reactor (GPR-1), a second gas phase reactor (GPR-2) and an optional a third gas phase reactor (GPR-3) connected in series are used. If needed prior to the slurry reactor (SR) a pre-polymerisation reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

The heterophasic polymer(s) of the invention is/are preferably produced by polymerisation using any suitable Ziegler-Natta type. Typical suitable Ziegler-Natta type catalyst is stereospecific, solid high yield Ziegler-Natta catalyst component comprising as essential components Mg, Ti and Cl. In addition to the solid catalyst a cocatalyst(s) as well external donor(s) are typically used in polymerisation process.

Components of catalyst may be supported on a particulate support, such as inorganic oxide, like silica or alumina, or, usually, the magnesium halide may form the solid support. It is also possible that catalysts components are not supported on an external support, but catalyst is prepared by emulsion-solidification method or by precipitation method.

Alternatively, the heterophasic polymer(s) of the invention can be produced using a modified catalyst system as described below.

More preferably, a vinyl compound of the formula (I) is used for the modification of the catalyst:

CH2=CH—CHR1R2    (I)

wherein R1 and R2 together form a 5- or 6-membered saturated, unsaturated or aromatic ring, optionally containing substituents, or independently represent an alkyl group comprising 1 to 4 carbon atoms, whereby in case R1 and R2 form an aromatic ring, the hydrogen atom of the —CHR1R2 moiety is not present.

More preferably, the vinyl compound (I) is selected from: vinyl cycloalkane, preferably vinyl cyclohexane (VCH), vinyl cyclopentane, 3-methyl-1-butene polymer and vinyl-2-methyl cyclohexane polymer. Most preferably the vinyl compound (I) is vinyl cyclohexane (VCH) polymer.

The solid catalyst usually also comprises an electron donor (internal electron donor) and optionally aluminium. Suitable internal electron donors are, among others, esters of carboxylic acids or dicarboxylic acids, like phthalates, maleates, benzoates, citraconates, and succinates, 1,3-diethers or oxygen or nitrogen containing silicon compounds. In addition, mixtures of donors can be used.

The cocatalyst typically comprises an aluminium alkyl compound. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride. Suitable external electron donors used in polymerisation are well known in the art and include ethers, ketones, amines, alcohols, phenols, phosphines and silanes. Silane type external donors are typically organosilane compounds containing Si—OCOR, Si—OR, or Si—NR2 bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882, WO2009/029486.

The polypropylene polymer composition, preferably the polypropylene copolymer composition, of the invention may comprise further polymer components that are different from the polypropylene copolymer(s) such as the heterophasic polymer(s). As an example further polymer components are other polyolefin components different from polypropylene copolymer(s), such as homo or copolymers of ethylene or C3 to C8 α-olefins together with comonomer(s) other than the first monomer. Most preferably, the polymeric components present in the composition of the invention consist of the polypropylene copolymer(s) such as the heterophasic polymer(s) only. "Polymeric components" excludes herein any carrier polymers of additive products, e.g. master batches of additives together with the carrier polymer, optionally present in the composition of the invention. Such optional carrier polymers are calculated to the amount of the respective additive based on the amount (100%) of the composition of the invention.

Accordingly, in one embodiment the polypropylene polymer composition, preferably the polypropylene copolymer composition, of the invention preferably comprises one or more additive(s) which is/are typically, and preferably, commercially available and can be selected from the group comprising pigments, preferably color pigments, antioxidants, UV stabilizers, and mixtures thereof.

Then, the polypropylene polymer composition, preferably the polypropylene copolymer composition, of the invention comprises, based on the total weight (100 wt.-%) of the polypropylene polymer composition, preferably the polypropylene copolymer composition, 93 to 98 wt.-% of the one or more polypropylene copolymer(s), and 2 to 7 wt.-% of optional, and preferable additives.

The total amount of optional and preferable additives is preferably between 2.5 and 6.5 wt.-%, preferably between 3 and 6 wt.-%, based on the total weight of the composition.

The polypropylene polymer composition, preferably the polypropylene copolymer composition, of the invention may contain one or more additive(s) selected from the group comprising pigments, preferably color pigments such as black and yellow pigments, more preferably carbon black, titanium dioxide and yellow pigment etc, antioxidants, UV stabilizers, and mixtures thereof. Each additive can be used e.g. in conventional amounts, the total amount of additives present in the propylene composition being preferably as defined below. Such additives are generally commercially available and are described, for example, in "Plastic Additives Handbook", 5th edition, 2001 of Hans Zweifel. It is appreciated that the amount and kind of additives can be adapted by the skilled person according to the desired end application.

It is preferred that the additives are preferably provided in form of a premix obtained by mixing the additives and optional carrier polymers in a conventional mixer.

The polypropylene polymer composition, preferably the polypropylene copolymer composition, of the invention preferably has one or more of the following properties:

a) a density measured according to ISO 1183, measured on compression moulded plaques of <920 kg/m³, more preferably in the range from 880 to 910 kg/m³, and/or b) a melt flow rate $MFR_2$ (230° C., 2.16 kg) measured according to ISO 1133 in the range from 1.0 to 110.0 g/10 min, preferably in the range from 1.0 to 100.0 g/10 min, more preferably in the range from 2.0 to 80.0 g/10 min, and most preferably in the range from 2.0 to 50.0 g/10 min, and/or c) a flexural modulus measured according to ISO 178 or –1% Secant according to ASTM D790 in the range from 700 to 2500 MPa, preferably in the range from 750 to 2000 MPa, more preferably in the range from 750 to 1500 MPa, and/or d) a heat deflection temperature (HDT) measured according to ISO 75-1/75-2 at a load of 1.82 MPa in the range of 56 to 150° C., more preferably in the range from 60 to 140° C., most preferably in the range from 60 to 100° C., and/or e) a Charpy notched impact strength measured according to ISO 179/1eA at –20° C. in the range of 1 to 70 kJ/m², preferably in the range of 1 to 50 kJ/m², most preferably in the range from 2 to 30 kJ/m².

In one embodiment, the polypropylene polymer composition, preferably the polypropylene copolymer composition, of the invention preferably has all of the following properties:

a) a density measured according to ISO 1183, measured on compression moulded plaques of <920 kg/m³, more preferably in the range from 880 to 910 kg/m³, and b) a melt flow rate $MFR_2$ (230° C., 2.16 kg) measured according to ISO 1133 in the range from 1.0 to 110.0 g/10 min, preferably in the range from 1.0 to 100.0 g/10 min, more preferably in the range from 2.0 to 80.0 g/10 min, and most preferably in the range from 2.0 to 50.0 g/10 min, and c) a flexural modulus measured according to ISO 178 or –1% Secant according to ASTM D790 in the range from 700 to 2500 MPa, preferably in the range from 750 to 2000 MPa, more preferably in the range from 750 to 1500 MPa, and d) a heat deflection temperature (HDT) measured according to ISO 75-1/75-2 at a load of 1.82 MPa in the range of 56 to 150° C., more preferably in the range from 60 to 140° C., most preferably in the range from 60 to 100° C., and e) a Charpy notched impact strength measured according to ISO 179/1eA at –20° C. in the range of 1 to 70 kJ/m², preferably in the range of 1 to 50 kJ/m², most preferably in the range from 2 to 30 kJ/m².

In view of the above, the present invention refers in another aspect to a polypropylene copolymer composition for a mounting device of a photovoltaic (MD) module. The polypropylene copolymer composition comprises from 93 to 98 wt.-%, based on the total weight of the polypropylene composition, of one or more polypropylene copolymer(s), wherein the polypropylene copolymer composition has one or more, preferably all of the following properties:

a) a density measured according to ISO 1183, measured on compression moulded plaques of <920 kg/m³, more preferably in the range from 880 to 910 kg/m³, and/or b) a melt flow rate $MFR_2$ (230° C., 2.16 kg) measured according to ISO 1133 in the range from 1.0 to 110.0 g/10 min, more preferably in the range from 1.0 to 100.0 g/10 min, like in the range from 2.0 to 90.0 g/10 min, and/or c) a flexural modulus measured according to ISO 178 or –1% Secant according to ASTM D790 in the range from 700 to 2500 MPa, preferably in the range from 750 to 2000 MPa, and/or d) a heat deflection temperature (HDT) measured according to ISO 75-1/75-2 at a load of 1.82 MPa in the range of 56 to 150° C., more preferably in the range from 60 to 140° C., and/or e) a Charpy notched impact strength measured according to ISO 179/1eA at –20° C. in the range of 1 to 70 kJ/m².

With regard to the definition of the polypropylene copolymer composition and preferred embodiments thereof, reference is made to the statements provided above when discussing the technical details of the mounting device (MD) of the present invention.

Connecting Element

A connecting element (CE) for a mounting device (MD) according to this invention comprises a polypropylene polymer composition It is appreciated that a connecting element (CE) refers to a device being adapted to connect two or more mounting devices (MD). The connecting element(s) (CE) thus hold(s) two or more mounting devices (MS) integrated to each other via said connecting element(s).

It is appreciated that two mounting devices (MD) can be connected by one or more connecting element(s). In one embodiment, two mounting devices (MD) are connected by one connecting element. In another embodiment, two mounting devices (MD) are connected by two or more, such as two or three, connecting elements.

Preferably, the connecting element (CE) is a moulded device comprising, preferably consisting of, the polypropylene polymer composition. That is to say, the connecting element (CE) comprises, preferably consists of, the polypropylene polymer composition.

The present connecting element (CE) is not restricted to a specific shape or form as long as it is suitable for the intended use, i.e. connecting two or more mounting devices (MD). The shape and/or form of the connecting element(s) depends on the intended end use application as evident for a skilled person in the art and can be adapted accordingly.

The connecting element (CE) of the present invention comprises, preferably consists of a polypropylene polymer composition. It is appreciated that the polypropylene polymer composition of the connecting element (CE) differs from the polypropylene polymer composition of the mounting device (MD).

It is preferred that the polypropylene polymer composition of the connecting element (CE) comprises one or more polypropylene homopolymer(s) and/or one or more heterophasic polymer(s).

In one embodiment, the polypropylene polymer composition of the connecting element (CE) comprises one or more polypropylene homopolymer(s) or one or more heterophasic polymer(s). Alternatively, the polypropylene polymer composition of the connecting element (CE) comprises one or more polypropylene homopolymer(s) and one or more heterophasic polymer(s).

Preferably, the polypropylene polymer composition of the connecting element (CE) comprises one or more polypropylene homopolymer(s) and one or more heterophasic polymer(s).

The term "polypropylene homopolymer(s)" used in the present invention relates to a polypropylene that consists substantially, i.e. of more than 99.7 wt.-%, still more preferably of at least 99.8 wt.-%, of propylene units. In a preferred embodiment, only propylene units in the polypropylene homopolymer(s) are detectable.

Alternatively, the polypropylene polymer composition comprises one or more heterophasic polymer(s) having a C2 comonomer content of below 5 wt.-%, based on the weight of the heterophasic polymer(s). For example, the one or more heterophasic polymer(s) have a C2 comonomer content from 0.5 to 5 wt.-%, preferably from 0.7 to 3 wt.-%, and most preferably from 1 to 1.5 wt.-%, based on the weight of the heterophasic polymer(s), Alternatively, the polypropylene polymer composition comprises one or more polypropylene homopolymer(s) and one or more heterophasic polymer(s) having a C2 comonomer content of below 5 wt.-%, based on the weight of the heterophasic polymer(s).

It is preferred that the polypropylene polymer composition comprises one or more polypropylene homopolymer(s) and/or one or more heterophasic polymer(s) having one or more, preferably all of the following properties:
  a) a density measured according to ISO 1183, measured on compression moulded plaques of <920 kg/m$^3$, more preferably in the range from 890 to <920 kg/m$^3$, and/or
  b) a melt flow rate MFR$_2$ (230° C., 2.16 kg) measured according to ISO 1133 or ASTM D1238 in the range from 0.1 to 100.0 g/10 min, more preferably in the range from 0.1 to 80.0 g/10 min, like in the range from 0.5 to 60.0 g/10 min, and/or
  c) a flexural modulus measured according to ISO 178 or −1% Secant according to ASTM D790 in the range from 900 to 4500 MPa, preferably in the range from 1000 to 2500 MPa, and/or
  d) a heat deflection temperature (HDT) measured according to ISO 75-1/75-2 at a load of 0.45 MPa in the range of 80 to 135° C., more preferably in the range from 90 to 130° C., and/or
  e) an Izod notched impact strength measured according to ASTM D256 at +23° C. in the range of 3 to 65 J/m.

In one embodiment, the polypropylene polymer composition comprises one or more polypropylene homopolymer(s) and/or one or more heterophasic polymer(s) having all of the following properties:
  a) a density measured according to ISO 1183, measured on compression moulded plaques of <920 kg/m$^3$, more preferably in the range from 890 to <920 kg/m$^3$, and
  b) a melt flow rate MFR$_2$ (230° C., 2.16 kg) measured according to ISO 1133 or ASTM D1238 in the range from 0.1 to 100.0 g/10 min, more preferably in the range from 0.1 to 80.0 g/10 min, like in the range from 0.5 to 60.0 g/10 min, and
  c) a flexural modulus measured according to ISO 178 or −1% Secant according to ASTM D790 in the range from 900 to 4500 MPa, preferably in the range from 1000 to 2500 MPa, and
  d) a heat deflection temperature (HDT) measured according to ISO 75-1/75-2 at a load of 0.45 MPa in the range of 80 to 135° C., more preferably in the range from 90 to 130° C., and
  e) an Izod notched impact strength measured according to ASTM D256 at +23° C. in the range of 3 to 65 J/m.

It is appreciated that the mechanical properties of the connecting element (CE) can be advantageously adjusted if the polypropylene polymer composition comprises one or more polypropylene homopolymer(s). The polypropylene polymer composition thus preferably comprises one, two or three or four polypropylene homopolymer(s). More preferably, the polypropylene polymer composition comprises two or three, most preferably two, polypropylene homopolymers. In one specifically preferred embodiment, the polypropylene polymer composition comprises one polypropylene homopolymer.

Alternatively, the mechanical properties of the connecting element (CE) can be adjusted if the polypropylene polymer composition comprises two or more heterophasic polymer(s).

The polypropylene polymer composition thus preferably comprises two or three or four heterophasic polymers. More preferably, the polypropylene copolymer composition comprises two or three, most preferably two, heterophasic polymers.

In one specifically preferred embodiment, the mechanical properties of the connecting element (CE) can be adjusted if the polypropylene polymer composition comprises one or more polypropylene homopolymer(s) and two or more heterophasic polymer(s). The polypropylene polymer composition thus preferably comprises one, two or three or four polypropylene homopolymer(s) and two or three or four heterophasic polymers. More preferably, the polypropylene polymer composition comprises one polypropylene homopolymer and two or three, most preferably two, heterophasic polymers.

If the polypropylene polymer composition comprises two or more polypropylene homopolymers and/or two or more heterophasic polymers, the polymers present in the polypropylene polymer composition differ from each other. For example, the two or more polypropylene homopolymers and/or two or more heterophasic polymers differ in their melt flow rate MFR$_2$ (230° C., 2.16 kg) measured according to ISO 1133 or ASTM D1238 by at least 10 g/10 min, preferably by at least 15 g/10 min, more preferably in the range from 15 to 70 g/10 min, e.g. in the range from 15 to 50 g/10 min.

Each polypropylene homopolymer and/or heterophasic polymer has preferably a flexural modulus in the range from 900 to 4500 MPa, preferably in the range from 1000 to 2500 MPa, when measured according to ISO178 or −1% Secant according to ASTM D790.

Each polypropylene homopolymer and/or heterophasic polymer has preferably a melt flow rate MFR$_2$ (230° C., 2.16 kg) measured according to ISO 1133 or ASTM D1238 in the range from 0.1 to 100.0 g/10 min, more preferably in the range from 0.1 to 80.0 g/10 min, like in the range from 0.5 to 60.0 g/10 min. If the polypropylene polymer composition comprises two or more, preferably two, polypropylene homopolymer(s), one polypropylene homopolymer preferably has a melt flow rate MFR$_2$ (230° C., 2.16 kg) measured according to ISO 1133 or ASTM D1238 in the range from 0.1 to 25.0 g/10 min, more preferably in the range from 0.1 to 15.0 g/10 min, like in the range from 0.5 to 10.0 g/10 min, another polypropylene homopolymer preferably has a melt flow rate MFR$_2$ (230° C., 2.16 kg) measured according to ISO 1133 or ASTM D1238 in the range from 25.0 to 100.0 g/10 min, more preferably in the range from 28.0 to 80.0 g/10 min, like in the range from 30.0 to 60.0 g/10 min.

If the polypropylene polymer composition comprises one polypropylene homopolymer and two heterophasic polymers, the polypropylene homopolymer preferably has a melt flow rate MFR$_2$ (230° C., 2.16 kg) measured according to ISO 1133 or ASTM D1238 in the range from 0.1 to 50.0 g/10 min, more preferably in the range from 5.0 to 30.0 g/10 min, like in the range from 10.0 to 25.0 g/10 min, one heterophasic polymer preferably has a melt flow rate MFR$_2$ (230° C., 2.16 kg) measured according to ISO 1133 or ASTM D1238 in the range from 0.1 to 70.0 g/10 min, more preferably in the range from 5.0 to 50.0 g/10 min, like in the range from 10.0 to 30.0 g/10 min, and another heterophasic polymer preferably has a melt flow rate MFR$_2$ (230° C., 2.16 kg) measured according to ISO 1133 or ASTM D1238 in the range from 0.1 to 50.0 g/10 min, more preferably in the range from 0.5 to 25.0 g/10 min, like in the range from 1.0 to 15.0 g/10 min.

Each polypropylene homopolymer and/or heterophasic polymer has preferably a density measured according to ISO 1183, measured on compression moulded plaques of <920 kg/m$^3$, more preferably in the range from 890 to <920 kg/m$^3$.

Each polypropylene homopolymer and/or heterophasic polymer has preferably a heat deflection temperature (HDT) measured according to ISO 75-1/75-2 at a load of 0.45 MPa in the range of 80 to 135° C., more preferably in the range from 90 to 130° C.

Each polypropylene homopolymer and/or heterophasic polymer has preferably an Izod notched impact strength measured according to ASTM D256 at +23° C. in the range of 3 to 65 J/m. If the polypropylene polymer composition comprises one polypropylene homopolymer and two heterophasic polymers, the polypropylene homopolymer preferably has an Izod notched impact strength measured according to ASTM D256 at +23° C. in the range of 3 to 30 J/m, preferably of 3 to 25 J/m, and each of the heterophasic polymers has an Izod notched impact strength measured according to ASTM D256 at +23° C. in the range of 30 to 65 J/m, preferably of 35 to 65 J/m.

If the polypropylene polymer composition comprises two polypropylene homopolymers, the weight ratio between the first and second polypropylene homopolymer is preferably from 10:1 to 1:1, more preferably from 8:1 to 1:1 and most preferably from 5:1 to 1:1, such as from 3:1 to 1:1.

For example, if the polypropylene polymer composition comprises two polypropylene homopolymers, the weight ratio between the first and second polypropylene homopolymer is preferably from 10:1 to 1:1, more preferably from 8:1 to 1:1 and most preferably from 5:1 to 1:1, such as from 3:1 to 1:1, and the first polypropylene homopolymer has a melt flow rate MFR$_2$ (230° C., 2.16 kg) measured according to ISO 1133 or ASTM D1238 in the range from 0.1 to 25.0 g/10 min, more preferably in the range from 0.1 to 15.0 g/10 min, like in the range from 0.5 to 10.0 g/10 min, and the second polypropylene homopolymer has a melt flow rate MFR$_2$ (230° C., 2.16 kg) measured according to ISO 1133 or ASTM D1238 in the range from 25.0 to 100.0 g/10 min, more preferably in the range from 28.0 to 80.0 g/10 min, like in the range from 30.0 to 60.0 g/10 min.

If the polypropylene polymer composition comprises one polypropylene homopolymer and two heterophasic polymers, the weight ratio between the one polypropylene homopolymer and the two heterophasic polymers is preferably from 10:1 to 1:1, more preferably from 8:1 to 1:1 and most preferably from 5:1 to 1:1, such as from 2:1 to 1:1. Additionally or alternatively, the weight ratio between the one polypropylene homopolymer and one heterophasic polymer is preferably from 10:1 to 1:1, more preferably from 8:1 to 1:1 and most preferably from 5:1 to 1:1, such as from 2:1 to 1:1, and the weight ratio between the one polypropylene homopolymer and the other heterophasic polymer is preferably from 30:1 to 5:1, more preferably from 25:1 to 8:1 and most preferably from 25:1 to 10:1, such as from 20:1 to 12:1. Additionally or alternatively, the weight ratio between the heterophasic polymer and the other heterophasic polymer is preferably from 30:1 to 3:1, more preferably from 25:1 to 5:1 and most preferably from 20:1 to 8:1, such as from 18:1 to 10:1.

The polypropylene homopolymer(s) or heterophasic polymer(s) are commercially available grade(s) or can be produced e.g. by conventional polymerisation processes. As non-limiting examples of suitable commercially available products (grades) for the connecting element (CE), for instance H130, H202HC, H503, CP202XP and CP401HC of Braskem can be mentioned. As an example of the polymerization process, above description as given for the polypropylene polymer composition in context of mounting device can be referred. In case of homopolymer of propylene, said homopolymer can be produced as described to polymerization process for preparing the matrix component of said polypropylene polymer composition of the mounting device.

The polypropylene polymer composition of the invention preferably further comprises from 15 to 35 wt.-%, more preferably from 15 to 30 wt.-%, based on the total weight of the composition, of enforcing filler(s) imparting improved stiffness and strength to the composition of the present invention.

Preferably, the enforcing filler(s) are glass fibers (GF). In particular, the glass fibers are cut glass fibers (GF), also known as short fibers or chopped strands.

Preferably, the glass fibers (GF) have a fiber average diameter in the range of 5 to 30 µm. More preferably, the glass fiber (GF) have a fiber average diameter in the range of 5 to 25 µm and most preferably in the range of 7 to 20 µm.

In one embodiment, the glass fibers (GF) have an average fiber length of from 0.1 to 20 mm and most preferably of 0.5 to 10 mm. For example, the glass fibers (GF) have an average fiber length of from 1 to 8 mm, such as from 2 to 6 mm.

Glass fibers (GF) being suitable for the present invention can be surface treated with a so called sizing agent.

Examples of sizing agents suitable for the glass fibers (GF) include silane sizing agents, titanate sizing agents, aluminum sizing agents, chromium sizing agents, zirconium sizing agents, borane sizing agents, and preferred are silane sizing agents or titanate sizing agents, and more preferably silane sizing. The amount of the sizing agent related to the glass fibers (GF) is within the common knowledge of a skilled person and can be, for example in the range of from 0.1 to 10 parts by weight of the sizing agent with respect to 100 parts by weight of the glass fiber (GF).

In one embodiment, the glass fibers (GF) comprise a sizing agent. Preferably, the sizing agent is a silane sizing agent.

The surface treatment of the glass fibers (GF) with a sizing agent can be done with known methods, like for example immersing the fibers in a tank in which a sizing agent is placed, being nipped and then drying in a hot-air oven, or with a hot roller or a hot plate.

The fillers suitable for the polymer composition of the connecting element (CE) of the present invention are preferably any conventional filler, preferably glass fiber (GF), and are commercially available from several suppliers. The choice of such filler, preferably glass fiber (GF), is within the skills of a person skilled in the art.

According to one embodiment, the polypropylene polymer composition of the invention preferably comprises one or more additive(s) which are typically, and preferably, commercially available and can be selected from the group comprising pigments, preferably color pigments, antioxidants, UV stabilizers, polar modified polypropylene (PMP) and mixtures thereof.

Then, the polypropylene polymer composition of the invention comprises, based on the total weight (100 wt.-%) of the polypropylene polymer composition,

- 56 to 83 wt.-% of the one or more polypropylene homopolymer(s) or the one or more heterophasic polymer(s), and
- to 35 wt.-%, of optional enforcing filler(s), preferably glass fibers (GF),
- 2 to 9 wt.-% of optional, and preferable additives.

The polypropylene polymer composition of the invention may contain one or more additive(s) selected from the group comprising pigments, preferably color pigments such as black and yellow pigments, more preferably carbon black, titanium dioxide and yellow pigment etc, antioxidants, UV stabilizers, polar modified polypropylene (PMP) and mixtures thereof. Each additive can be used e.g. in conventional amounts, the total amount of additives present in the propylene composition being preferably as defined below. Such additives are generally commercially available and are described, for example, in "Plastic Additives Handbook", 5th edition, 2001 of Hans Zweifel. It is appreciated that the amount and kind of additives can be adapted by the skilled person according to the desired end application.

It is preferred that the additives are preferably provided in form of a premix obtained by mixing the additives and optional carrier polymers in a conventional mixer.

The polypropylene polymer composition of the invention preferably has one or more of the following properties:

a) a density measured according to ISO 1183, measured on compression moulded plaques of >920 kg/m$^3$, more preferably in the range from >920 to 1100 kg/m$^3$, and/or b) a melt flow rate MFR$_2$ (230° C., 2.16 kg) measured according to ISO 1133 in the range from 1.0 to 110.0 g/10 min, preferably in the range from 1.0 to 100.0 g/10 min, more preferably in the range from 2.0 to 80.0 g/10 min, and most preferably in the range from 2.0 to 50.0 g/10 min, and/or c) a flexural modulus measured according to ISO 178 or −1% Secant according to ASTM D790 in the range from 2000 to 6600 MPa, preferably in the range from 2500 to 6000 MPa, more preferably in the range from 3000 to 5500 MPa, and/or d) a heat deflection temperature (HDT) measured according to ISO 75-1/75-2 at a load of 1.82 MPa in the range of 90 to 160° C., more preferably in the range from 100 to 155° C., most preferably in the range from 110 to 150° C., and/or e) a Charpy notched impact strength measured according to ISO 179/1eA at +23° C. in the range of 1 to 70 kJ/m$^2$, preferably in the range of 2 to 60 kJ/m$^2$, most preferably in the range from 5 to 50 kJ/m$^2$.

In one embodiment, the polypropylene polymer composition of the invention preferably has all of the following properties:

a) a density measured according to ISO 1183, measured on compression moulded plaques of >920 kg/m$^3$, more preferably in the range from >920 to 1100 kg/m$^3$, and b) a melt flow rate MFR$_2$ (230° C., 2.16 kg) measured according to ISO 1133 in the range from 1.0 to 110.0 g/10 min, preferably in the range from 1.0 to 100.0 g/10 min, more preferably in the range from 2.0 to 80.0 g/10 min, and most preferably in the range from 2.0 to 50.0 g/10 min, and c) a flexural modulus measured according to ISO 178 or −1% Secant according to ASTM D790 in the range from 2000 to 6600 MPa, preferably in the range from 2500 to 6000 MPa, more preferably in the range from 3000 to 5500 MPa, and d) a heat deflection temperature (HDT) measured according to ISO 75-1/75-2 at a load of 1.82 MPa in the range of 90 to 160° C., more preferably in the range from 100 to 155° C., most preferably in the range from 110 to 150° C., and e) a Charpy notched impact strength measured according to ISO 179/1eA at +23° C. in the range of 1 to 70 kJ/m$^2$, preferably in the range of 2 to 60 kJ/m$^2$, most preferably in the range from 5 to 50 kJ/m$^2$.

In view of the above, the present invention refers in another aspect to a polypropylene polymer composition comprising from 56 to 83 wt.-%, based on the total weight of the composition, of one or more polypropylene homopolymer(s) and/or one or more heterophasic polymer(s) for a connecting element (CE) for a mounting device (MD). The polypropylene polymer composition has one or more, preferably all of the following properties:

a) a density measured according to ISO 1183, measured on compression moulded plaques of >920 kg/m$^3$, more preferably in the range from >920 to 1100 kg/m$^3$, and/or b) a melt flow rate MFR$_2$ (230° C., 2.16 kg) measured according to ISO 1133 in the range from 1.0 to 110.0 g/10 min, preferably in the range from 1.0 to 100.0 g/10 min, more preferably in the range from 2.0 to 80.0 g/10 min, and most preferably in the range from 2.0 to 50.0 g/10 min, and/or c) a flexural modulus measured according to ISO 178 or −1% Secant according to ASTM D790 in the range from 2000 to 6600 MPa, preferably in the range from 2500 to 6000 MPa, more preferably in the range from 3000 to 5500 MPa, and/or d) a heat deflection temperature (HDT) measured according to ISO 75-1/75-2 at a load of 1.82 MPa in the range of 90 to 160° C., more preferably in the range from 100 to 155° C., most preferably in the range from 110 to 150° C., and/or e) a Charpy notched impact strength measured according to ISO 179/1eA at +23° C. in the range of 1 to 70 kJ/m$^2$, preferably in the range of 2 to 60 kJ/m$^2$, most preferably in the range from 5 to 50 kJ/m$^2$.

With regard to the definition of the polypropylene polymer composition and preferred embodiments thereof, reference is made to the statements provided above when discussing the technical details of the connecting element (CE) of the present invention.

Mounting Structure and Array

According to a further aspect, a mounting structure (MS) is provided. The mounting structure (MS) comprises a mounting device (MD) as defined herein and a photovoltaic (PV) module, wherein the photovoltaic (PV) module is mounted to the mounting device (MD), preferably mounted on the top of the mounting device (MD). It is thus appreciated that the mounting device (MD) is adapted to support and/or fix the photovoltaic (PV) module. For example, the mounting device (MD) is adapted to support and/or fix the photovoltaic (PV) module on the top of the mounting device (MD).

"Support" or "supported" means that the photovoltaic (PV) module is attached to the mounting device (MD) in such a way that it can be e.g. removed from said mounting device, if desired. "Fix" or "fixed" means herein that the photovoltaic (PV) module is attached to the mounting device "permanently" in such a way that if the photovoltaic (PV) module is removed from said mounting device (MD), then the integrity of the PV module and/or mounting device is disrupted. Said expressions are well known to a person skilled in the art.

The photovoltaic (PV) module preferably comprises a photovoltaic element and one or more further layer elements as described above. For example, a photovoltaic (PV) module comprises, in the given order, a protective front layer element, a front encapsulation layer element, a photovoltaic element, a rear encapsulation layer element and a protective back layer element. The protective back layer element is also known as backsheet layer element. It is preferred that the photovoltaic (PV) module is a premade photovoltaic (PV) module. The meaning and typical structures of photovoltaic (PV) module is well known to a skilled person in the solar energy (PV module) field.

With regard to the definition of the mounting device (MD) and preferred embodiments thereof, reference is made to the statements provided above when discussing the technical details of the mounting device (MD) of the present invention.

For example, the mounting structure (MS) comprises a mounting device (MD), preferably a floating mounting device, and a photovoltaic (PV) module comprising, in the given order, a protective front layer element, a front encapsulation layer element, a photovoltaic element, a rear encapsulation layer element and a protective back layer element. The protective back layer element is also known as backsheet layer element.

In order to ensure a high energy output, photovoltaic (PV) modules are typically provided in form of solar power plants comprising a plurality of such modules.

Thus, the corresponding mounting structures are preferably provided in form of an array of mounting structures (MS).

According to another aspect, the present invention thus refers to an array of mounting structures (MS) comprising two or more mounting structures (MS) as defined herein.

It is preferred that the two or more mounting structures (MS) of an array are hold in a specific position, which is especially advantageous in case the mounting device (MD) is a floating mounting device and thus not fixed on the ground. In this embodiment, it is preferred that the mounting devices (MD) are connected with each other by connecting elements (CE) in order to hold the devices together and thus to keep the structure of the array. Thus, the array further comprises one or more connecting element(s) (CE) as defined herein. It is preferred that the one or more connecting element(s) (CE) is/are adapted to connect the mounting devices (MD) of two or more mounting devices (MD) with each other.

In addition to connecting the two or more mounting devices (MD) of an array of the invention with each other, the one or more connecting element(s) (CE) also contribute(s) (provides the means) to keep the mounting structures (MS) integrated in the array assembly.

In the following the invention is described in more detail.

EXAMPLES a. Determination Methods

Melt Flow Rate: The melt flow rate (MFR) is determined according to ISO 1133 or according to ASTM D1238 and is indicated in g/10 min, as specified herein. The MFR is an indication of the flowability, and hence the processability, of the polymer. The higher the melt flow rate, the lower the viscosity of the polymer. The $MFR_2$ of polypropylene is measured at a temperature 230° C. and a load of 2.16 kg.

Density: ISO 1183, measured on compression moulded plaques. Alternatively, the density is measured according to ASTM D792, as specified herein.

Comonomer content: The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Specifically, the butene or hexene content of a polypropylene copolymer is determined using the baseline corrected peak area of the quantitative bands found at 1377-1379 $cm^{-1}$. Quantitative results are obtained based upon reference to the film thickness.

The comonomer content is herein assumed to follow the mixing rule (equation 2):

$$C_b = w_1 \cdot C_1 + w_2 \cdot C_2 \qquad \text{(eq. 2)}$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad \text{(eq. 3)}$$

where $c_m$ is the mole fraction of comonomer units in the copolymer, c w is the weight fraction of comonomer units in the copolymer, MW, is the molecular weight of the comonomer (such as ethylene) and MW m is the molecular weight of the main monomer (i.e., propylene).

Flexural Modulus: The flexural modulus was determined according to ISO 178, as specified herein. The test specimens having a dimension of 80×10×4.0 $mm^3$ (length× width×thickness) were prepared by injection molding according to EN ISO 1873-2. The length of the span between the supports was 64 mm, the test speed was 2 mm/min and the force was 100 N. Alternatively, the flexural modulus was determined according to ASTM D790 (— 1% Secant), as specified herein.

Izod impact strength notched: Izod notched impact strength was measured according to ISO 180 at +23° C. or −20° C., or according to ASTM D256 at −20° C. or +23° C., as specified herein. Charpy impact strength notched: NIS was determined according to ISO 179-1eA:2000 on V-notched samples of 80×10×4 mm 3 at 23° C., or −20° C., as specified herein. The test specimens were prepared by injection moulding using an IM V 60 TECH machinery in line with EN ISO 1873-2 (80*10×4 mm 3). The melt temperature was 200° C. and the mould temperature was 40° C.

Charpy impact strength unnotched: was determined according to ISO 179-1eU:2000 at +23° C.

Tensile Modulus; Tensile stress at yield and Tensile strain at break: are measured according to ISO 527-2: 1996 (cross head speed=1 mm/min; 23° C. for Tensile Modus Measurement and cross head speed=50 mm/min; 23° C. for Tensile stress at yield and Tensile strain at break measurement) using dogbone shape pressed out of the film samples prepared as described under experimental part. Dogbone dimensions are shown in the Figure.

Tensile strength at yield: is measured according to ISO 527-1 or ASTM D638, as specified herein.

Vicat softening temperature: measured according to ISO 306 or ASTM D 1525 at 10N, as specified herein.

Heat deflection temperature (HDT): measured on injection moulded test specimen as described in EN ISO 1873-2 (80×10×4 mm 3) that are placed in a heating bath, testing horizontally on two supports according to ISO 75-1/75-2. A constant load (0.45 MPa or 1.82 MPa) is applied in the centre of the specimen (three-point bending) and the bath temperature is raised at a constant rate. The temperature of the bath at which the flexural deflection of the loading point has reached a predefined level is the heat deflection temperature of the material.

Weathering resistance: measured according to ISO 4892-2 in a Weather-o-meter (AMETEK Atlas, having a quartz-jacketed xenon-arc lamp) by applying the following parameters: Irradiance=0.51 W/m², Black Panel Temperature: 65° C., 24 hours light, 102 minutes light/18 minutes light and spray (cycles simulating the daylight and a shorter period with daylight and rain) on test specimen according to ISO 527 (Type 1A) for the tensile properties and according to ISO 180 for Izod impact resistance. Samples were taken out of the Weather-o-meter after 4000 h, 8000 h and 12000 h and the mechanical data of these samples were measured.

Antifungal activity: measured according to ASTM G21-2015 on 50×50×2 mm test specimen with different fungi. The growth of these fungi was classified as follows:

| Growth above the tested material | Classification |
| --- | --- |
| None | 0 |
| Traces of growth (<10%) | 1 |
| Slight growth (10 to 30%) | 2 |
| Medium growth (30 to 60%) | 3 |
| High growth (>60%) | 4 | b. Application Examples

The following inventive example of a composition of a mounting device was prepared in that the HECO1 and HECO2 were combined and mixed with the additives, which were provided as a premix, by and compounded on a co-rotating twin-screw extruder.

Table 1 summarizes the composition of the inventive mounting device and their properties

TABLE 1

Overview of composition and mechanics for the composition of the inventive mounting device

|  |  | IE | Test method |
| --- | --- | --- | --- |
| HECO1 | [wt.-%] | 80 |  |
| HECO2 | [wt.-%] | 15 |  |
| Additives | [wt.-%] | 5 |  |
| Density | [kg/m³] | 900 | ISO 1183 |
| Melt flow rate MFR$_2$ (230° C./2.16 kg) | [g/10 min] | 15 | ISO 1133 |
| Flexural modulus (2 mm/min) | [MPa] | 930 | ISO 178 |
| Tensile stress at yield (50 mm/min) | [MPa] | 20 | ISO 527-2 |

TABLE 1-continued

Overview of composition and mechanics for the composition of the inventive mounting device

|  |  | IE | Test method |
| --- | --- | --- | --- |
| Charpy notched impact +23° C. | [kJ/m²] | 16 | ISO 179/1eA |
| Charpy notched impact −20° C. | [kJ/m²] | 9 | ISO 179/1eA |
| Heat deflection temperature at 1.82 MPa | [° C.] | 66 | ISO 75-1/75-2-2 |

"HECO1" is the commercial heterophasic copolymer CP 396 XP of Braskem having a melt flow rate MFR$_2$ (230° C./2.16 kg) according to ASTM D1238 of 11 g/10 min, a density according to ISO 1183-1 of 895 kg/m³, a flexural modulus according to ISO 178 of 950 MPa, an Izod notched impact strength at −20° C. according to ISO 180 of 9 kJ/m², Vicat softening temperature at 10N according to ISO 306 of 140° C., a heat deflection temperature (HDT) at 0.45 MPa according to ISO 75-1/75-2-1/75-2 of 66° C. and a tensile strength at yield according to ISO 527-1 of 19 MPa.

"HECO2" is the commercial heterophasic copolymer CP 180 R of Braskem having a melt flow rate MFR$_2$ (230° C./2.16 kg) according to ASTM D1238 of 80 g/10 min, a density according to ASTM 792 of 900 kg/m³, a flexural modulus −1% Secant according to ASTM D790 of 1500 MPa, an Izod notched impact strength at −20° C. according to ASTM D256 of J/m, Vicat softening temperature at 10N according to ASTM D1525 of 150° C., a heat deflection temperature (HDT) at 0.45 MPa according to ASTM D648 of 125° C. and a tensile strength at yield according to ASTM D638 of 30 MPa.

"Additives" were commercially available carbon black, yellow pigment (cas no. 68186-90-3) and titanium dioxide, as well as antioxidant and a UV stabilizer, and used in conventional amounts.

The following inventive example of a composition of a connecting element was prepared in that the HPP1 and HPP2 were combined and mixed with the additives, which were provided as a premix, and compounded on a co-rotating twin-screw extruder.

Table 2 summarizes the composition of the inventive connecting element and their properties

TABLE 2

Overview of composition and mechanics for the composition of the inventive connecting element

|  |  | IE1 | IE2 | Test method |
| --- | --- | --- | --- | --- |
| HPP1 | [wt.-%] | 30 | 40 |  |
| HPP2 | [wt.-%] | 43 | — |  |
| HECO1 | [wt.-] | — | 33 |  |
| Glass fibers | [wt.-%] | 20 | 20 |  |
| Additives | [wt.-%] | 7 | 7 |  |
| Density | [kg/m³] | 1040 | 1040 | ISO 1183 |
| Melt flow rate MFR$_2$ (230° C./2.16 kg) | [g/10 min] | 15 | 15 | ISO 1133 |
| Flexural modulus (2 mm/min) | [MPa] | 4650 | 4200 | ISO 178 |
| Tensile stress at yield (50 mm/min) | [MPa] | 64 | 58 | ISO 527-2 |
| Charpy notched impact +23° C. | [kJ/m²] | 8 | 8 | ISO 179/1eA |
| Charpy unnotched impact +23° C. | [kJ/m²] | 33 | 33 | ISO 179/1eU |
| Heat deflection temperature at 1.82 MPa | [° C.] | 140 | 140 | ISO 75-1/75-2-2 |

"HPP1" is the commercial propylene homopolymer H 130 of Braskem having a melt flow rate MFR$_2$ (230° C./2.16 kg) according to ASTM D1238 of 40 g/10 min, a density according to ASTM D792 of 905 kg/m³, a flexural modulus −1% Secant according to ASTM D790 of 1200 MPa, an Izod notched impact strength at +23° C. according to ASTM D256 of 20 J/m, a heat deflection temperature (HDT) at 0.45 MPa according to ASTM D648 of 98° C. and a tensile strength at yield according to ASTM D638 of 34 MPa.

"HPP2" is the commercial propylene homopolymer H 503 of Braskem having a melt flow rate MFR$_2$ (230° C./2.16 kg) according to ASTM D1238 of 3.5 g/10 min, a density according to ASTM D792 of 905 kg/m³, a flexural modulus −1% Secant according to ASTM D790 of 1300 MPa, an Izod notched impact strength at +23° C. according to ASTM D256 of 30 J/m, a heat deflection temperature (HDT) according to ASTM D648 of 98° C. and a tensile strength at yield according to ASTM D638 of 35 MPa.

"HECO1" is the commercial propylene homopolymer CP 202XP of Braskem having a melt flow rate MFR$_2$ (230° C./2.16 kg) according to ASTM D1238 of 26 g/10 min, a density according to ASTM D792 of 900 kg/m³, a flexural modulus −1% Secant according to ASTM D790 of 1500 MPa, an Izod notched impact strength at +23° C. according to ASTM D256 of 55 J/m, a heat deflection temperature (HDT) according to ASTM D648 of 121° C. and a tensile strength at yield according to ASTM D638 of 32 MPa.

"Glass fibers" is a cut glass fiber having an average length of 4 mm.

"Additives" were commercially available carbon black, yellow pigment (cas no. 68186-90-3), maleic anhydride modified copolymer of polypropylene and titanium dioxide, as well as antioxidant and a UV stabilizer, and used in conventional amounts.

Table 3 summarizes the resistance of the composition according to Table 1 for the mounting element against different fungi.

TABLE 3

Overview of the resistance against different fungi.

| | Aspergillus brasiliensis ATCC n° 9642 | Aureobasidium pullulans ATCC n° 15233 | Penicillium funiculosum ATCC n° 11797 | Chaetomium globolosum ATCC n° 6205 | Trichoderma virens ATCC n° 9645 |
|---|---|---|---|---|---|
| Classification | 0 | 0 | 0 | 0 | 0 |

From above table can be gathered that the polymer composition for the mounting element according to the present invention shows a very good resistance against fungi.

Table 4 summarizes the results of the weathering test for the polymer composition according to Table 1 for the mounting element and for the polymer composition according to Table 2 (IE2) for the connecting element.

TABLE 4

Results of the weathering test.

| Mounting Element | 0 h | 4000 h | 8000 h | 12000 h |
|---|---|---|---|---|
| Impact Resistance at 23° C. (Notched Izod) [kJ/m²] | 46.0 | 50.0 | 51.5 | 47.1 |
| Tensile Stress at Yield 23° C. [MPa] | 17.8 | 18.4 | 18.5 | 18.4 |
| Tensile Stress at Break 23° C. [MPa] | 13.5 | 13.8 | 14.2 | 14.2 |
| Elongation at Yield [%] | 10.0 | 9.9 | 9.9 | 9.4 |

TABLE 4-continued

Results of the weathering test.

| Mounting Element | 0 h | 4000 h | 8000 h | 12000 h |
|---|---|---|---|---|
| Connecting Element | | | | |
| Impact Resistance at 23° C. (Notched Izod) [kJ/m²] | 5.7 | 5.5 | 7.0 | 5.8 |
| Tensile Stress at Yield 23° C. [MPa] | 59.7 | 60.7 | 62.7 | 62.3 |
| Tensile Stress at Break 23° C. [MPa] | 58.2 | 60.0 | 60.5 | 61.3 |
| Elongation at Yield [%] | 8.1 | 8.1 | 8.1 | 7.8 |

The results according to Table 4 demonstrate that the mechanical properties of the mounting element and the connecting element according to the present maintain after 12000 hours almost at the level of the test piece before the weathering test. Therefore, both polymer compositions have an excellent weathering resistance.

The invention claimed is:

1. A mounting device (MD) for a photovoltaic (PV) module, the mounting device (MD) being a molded device adapted to support and/or fix a photovoltaic (PV) module and comprising a polypropylene polymer composition, wherein the polypropylene polymer composition is a polypropylene copolymer composition which comprises 93 to 98 wt % of two or more polypropylene copolymers differing in their melt flow rate MFR$_2$ (230° C., 2.16 kg) measured according to ISO 1133 or ASTM D1238 by at least 30 g/10 min and having the following properties:
   a) a density measured according to ISO 1183, measured on compression moulded plaques of <920 kg/m²,
   b) a melt flow rate MFR$_2$ (230° C., 2.16 kg) measured according to ISO 1133 or ASTM D1238 in the range from 1.0 to 110.0 g/10 min,
   c) a flexural modulus measured according to ISO 178 or −1% Secant according to ASTM D790 in the range from 700 to 2500 MPa,
   d) a heat deflection temperature (HDT) measured according to ISO 75-1/75-2 at a load of 1.82 MPa in the range of 56 to 150° C., and
   e) an Izod notched impact strength measured according to ISO 180/1eA at −20° C. in the range of 1 to 70 kJ/m² or an Izod notched impact strength measured according to ASTM D256 at −20° C. in the range of 1 to 70 J/m
   wherein the two or more polypropylene copolymer(s) comprising a heterophasic polymer having a melt flow rate MFR$_2$ (230° C., 2.16 kg) measured according to ISO 1133 or ASTM D1238 in the range from 50.0 to 110.0 g/10 min.

2. The mounting device (MD) according to claim 1, wherein the polypropylene copolymer composition comprises one or more polypropylene copolymer(s) comprising propylene monomer units and comonomer units selected from ethylene and/or at least one $C_4$ to $C_{12}$ α-olefin.

3. The mounting device (MD) according to claim 1, wherein the polypropylene copolymer composition comprises one or more polypropylene copolymer(s) having one or more of the following properties:
   a) a density measured according to ISO 1183, measured on compression moulded plaques in the range from 880 to 910 kg/m³,
   b) a melt flow rate MFR$_2$ (230° C., 2.16 kg) measured according to ISO 1133 or ASTM D1238 in the range from 2.0 to 90.0 g/10 min,
   c) a flexural modulus measured according to ISO 178 or −1% Secant according to ASTM D790 in the range from 750 to 2000 MPa,
   d) a heat deflection temperature (HDT) measured according to ISO 75-1/75-2 at a load of 0.45 MPa in the range from 60 to 140° C.

4. The mounting device (MD) according to claim 1, wherein the polypropylene polymer composition, further comprises from 2 to 7 wt.-%, based on the total weight of the composition, of one or more additive(s) selected from the group comprising pigments, antioxidants, UV stabilizers, and mixtures thereof.

5. The mounting device (MD) according to claim 1, wherein the mounting device (MD) is a floating mounting device.

6. A mounting structure (MS) comprising a mounting device (MD) according to claim 1 and a photovoltaic (PV) module, wherein the photovoltaic (PV) module is mounted to the mounting device (MD).

7. The mounting structure (MS) according to claim 6, wherein the photovoltaic (PV) module comprises a photovoltaic element and one or more further layer elements.

8. An array of mounting structures (MS) comprising two or more mounting structures (MS) according to claim 6.

9. The array of mounting structures (MS) according to claim 8, wherein the array further comprises one or more connecting element(s) (CE) comprising a polypropylene polymer composition.

10. The array of mounting structures (MS) according to claim 9, wherein the one or more connecting element(s) (CE) is/are adapted to connect the two or more mounting devices (MD).

11. A mounting device (MD) for a photovoltaic (PV) module, the mounting device (MD) being a molded device adapted to support and/or fix a photovoltaic (PV) module and comprising a polypropylene polymer composition, wherein the polypropylene polymer composition is a polypropylene copolymer composition which comprises 93 to 98 wt % of one or more polypropylene copolymer(s) having the following properties:
   a) a density measured according to ISO 1183, measured on compression moulded plaques of <920 kg/m³,
   b) a melt flow rate MFR$_2$ (230° C., 2.16 kg) measured according to ISO 1133 or ASTM D1238 in the range from 1.0 to 110.0 g/10 min,
   c) a flexural modulus measured according to ISO 178 or −1% Secant according to ASTM D790 in the range from 700 to 2500 MPa,
   d) a heat deflection temperature (HDT) measured according to ISO 75-1/75-2 at a load of 1.82 MPa in the range of 56 to 150° C., and
   e) an Izod notched impact strength measured according to ISO 180/1eA at −20° C. in the range of 1 to 70 kJ/m² or an Izod notched impact strength measured according to ASTM D256 at −20° C. in the range of 1 to 70 J/m;
   the one or more polypropylene copolymer(s) comprising a heterophasic polymer having a melt flow rate MFR$_2$ (230° C., 2.16 kg) measured according to ISO 1133 or ASTM D1238 in the range from 50.0 to 110.0 g/10 min.

12. A mounting structure (MS) comprising a mounting device (MD) according to claim 11 and a photovoltaic (PV) module, wherein the photovoltaic (PV) module is mounted to the mounting device (MD).

13. The mounting structure (MS) according to claim 12, wherein the photovoltaic (PV) module comprises a photovoltaic element and one or more further layer elements.

14. An array of mounting structures (MS) comprising two or more mounting structures (MS) according to claim 12.

15. The array of mounting structures (MS) according to claim 14, wherein the array further comprises one or more connecting element(s) (CE) comprising a polypropylene polymer composition.

16. The array of mounting structures (MS) according to claim 15, wherein the one or more connecting element(s) (CE) is/are adapted to connect the two or more mounting devices (MD).

* * * * *